United States Patent
Chen et al.

(10) Patent No.: US 11,214,657 B2
(45) Date of Patent: Jan. 4, 2022

(54) PREPARATION METHOD OF POWDERY POLYCARBOXYLATE SUPERPLASTICIZER

(71) Applicant: Jiahua Science & Technology Development (Shanghai) Ltd., Shanghai (CN)

(72) Inventors: Yandan Chen, Shanghai (CN); Ke Lai, Shanghai (CN); Yubo Li, Shanghai (CN)

(73) Assignee: Jiahua Science & Technology Development (Shanghai) Ltd., Shanghai (CN)

( * ) Notice: Subject to any disclaimer, the term of this patent is extended or adjusted under 35 U.S.C. 154(b) by 80 days.

(21) Appl. No.: 16/685,779

(22) Filed: Nov. 15, 2019

(65) Prior Publication Data
US 2020/0277451 A1 Sep. 3, 2020

(30) Foreign Application Priority Data
Sep. 17, 2018 (CN) .......................... 201811084996.3

(51) Int. Cl.

| | |
|---|---|
| *C08F 220/04* | (2006.01) |
| *C08F 220/06* | (2006.01) |
| *C08F 222/04* | (2006.01) |
| *C08F 222/06* | (2006.01) |
| *C08F 216/04* | (2006.01) |
| *C08F 216/08* | (2006.01) |
| *C08F 216/12* | (2006.01) |
| *C08F 226/02* | (2006.01) |
| *C08F 226/04* | (2006.01) |
| *C08J 3/12* | (2006.01) |
| *C04B 24/26* | (2006.01) |
| *C08F 20/06* | (2006.01) |
| *C08F 22/06* | (2006.01) |
| *C04B 103/32* | (2006.01) |
| *C08F 222/02* | (2006.01) |
| *C08F 216/14* | (2006.01) |

(52) U.S. Cl.
CPC ............... *C08J 3/12* (2013.01); *C04B 24/267* (2013.01); *C08F 20/06* (2013.01); *C08F 22/06* (2013.01); *C04B 2103/32* (2013.01); *C08F 216/04* (2013.01); *C08F 216/08* (2013.01); *C08F 216/12* (2013.01); *C08F 216/1433* (2020.02); *C08F 220/04* (2013.01); *C08F 220/06* (2013.01); *C08F 222/02* (2013.01); *C08F 222/06* (2013.01); *C08F 226/02* (2013.01); *C08F 226/04* (2013.01); *C08J 2333/02* (2013.01); *C08J 2337/00* (2013.01)

(58) Field of Classification Search
None
See application file for complete search history.

(56) References Cited

FOREIGN PATENT DOCUMENTS

| | | | |
|---|---|---|---|
| CN | 105061689 A | | 11/2015 |
| CN | 106587703 A | | 4/2017 |
| CN | 108409918 A | | 8/2018 |
| JP | 2009242611 A | * | 10/2009 |
| JP | 5072326 B2 | | 11/2012 |

OTHER PUBLICATIONS

First Office Action for corresponding CN Patent Application 201811084996.3, dated Sep. 28, 2020, and English Translation thereof, 13 total pages.

* cited by examiner

*Primary Examiner* — Richard A Huhn
(74) *Attorney, Agent, or Firm* — Armstrong Teasdale LLP

(57) ABSTRACT

A preparation method of a powdery polycarboxylate superplasticizer is provided, including: mixing a superplasticizer monomer with water to produce a mixture, heating and melting the mixture to produce a melt system; carrying out a bulk polymerization reaction by adding an initiator, a chain transfer agent and an unsaturated carboxylic acid into the melt system, forming a polycarboxylate superplasticizer precursor; and neutralizing and pulverizing the polycarboxylate superplasticizer precursor to produce a powdery polycarboxylate superplasticizer. Water is added in the bulk polymerization and reacts with the superplasticizer monomer and the unsaturated carboxylic acid. While the bulk polymerization reaction is guaranteed to be efficiently carried out and the solid polycarboxylate superplasticizer is formed, the viscosity of a bulk polymerization reaction system is reduced. The superplasticizer is suitable for dry-mixed mortar, high-efficiency concrete and other products.

10 Claims, No Drawings

PREPARATION METHOD OF POWDERY POLYCARBOXYLATE SUPERPLASTICIZER

CROSS-REFERENCE TO RELATED APPLICATION

This application claims priority benefits to Chinese Patent Application No. 201811084996.3, filed on Sep. 17, 2018. The contents of all of the aforementioned applications are incorporated herein by reference.

TECHNICAL FIELD

The disclosure belongs to the technical field of concrete admixtures, and particularly relates to a preparation method of a powdery polycarboxylate superplasticizer.

BACKGROUND

Concrete has become the foundation of human life and is a building material which is mostly used. The concrete admixtures are the fifth component of concrete besides cement, sand, stones and water and play a very important role in application of high-performance concrete. As one of the concrete admixtures, the superplasticizer can reduce the water consumption during mixing and increase the strength of concrete under the condition of constant workability of concrete and constant amount of cement, and become a research hot spot and development focus of the field of the concrete admixtures. The superplasticizer prevents or destroys the flocculation structure of cement particles by surface activity, complexation, electrostatic repulsive force or stereoscopic repulsive force, thereby ensuring the workability and strength of the concrete while saving cement dosage. The polycarboxylate superplasticizer has the advantages of low mixing amount, high water reduction rate, high freedom of molecular structure design and environmental friendliness, so that it is known as the third generation of concrete superplasticizers to be widely used in projects such as high-speed rails, highways, bridges, tunnels and high-rise buildings.

At present, for most studies, the polycarboxylate superplasticizer is synthesized by aqueous solution polymerization, and most of polycarboxylate products sold on the market are water soluble, and the mass fraction thereof is 20%-50%. The liquid polycarboxylate superplasticizer is not convenient to package and transport, so that the transportation cost will be greatly increased when the construction site is far away, and it cannot be used for the case where the solid superplasticizer is required, such as dry mixed mortar, therefore, it is necessary to develop high-concentration polycarboxylate superplasticizers or solid polycarboxylate superplasticizers.

Bulk polymerization is a process of a polymerization reaction of a reactive monomer under the action of an initiator in absence of solvents. The bulk polymerization has high initiation speed and initiation strength when synthesizing the polycarboxylate superplasticizer, and is suitable for synthesizing the solid polycarboxylate superplasticizer with high solid content. However, in the reaction process of bulk polymerization, the heat release rate is fast, which is easy to cause the result that the reaction rate is fast, the heat release amount is large during the reaction process, and the viscosity of the reaction system is increased, so that the convective thermal conductivity coefficient is reduced, causing local reaction overheating or even implosion to result in gel effect, which affects the product performance.

SUMMARY

Therefore, the technical problem to be solved by the disclosure is to overcome the defects that in the prior art, when the polycarboxylate superplasticizer is synthesized by bulk polymerization, the viscosity of the reaction system is too high, and local overheating or even implosion is likely to occur, resulting in the decrease of the performance of the polycarboxylate superplasticizer.

Therefore, the disclosure provides the following technical solution:

the disclosure provides a preparation method of a powdery polycarboxylate superplasticizer, comprising the following steps:

(1) mixing a superplasticizer monomer with water to produce a mixture, and heating and melting the mixture to produce a melt system;

(2) carrying out a bulk polymerization reaction by adding an initiator, a chain transfer agent and an unsaturated carboxylic acid into the melt system produced in the step (1), forming a polycarboxylate superplasticizer precursor; and (3) neutralizing and pulverizing the polycarboxylate superplasticizer precursor to produce a powdery polycarboxylate superplasticizer.

Optionally, according to the above preparation method, in the step (1), a mixing amount of the water is 0.8-1.2 wt % of a mixing amount of the superplasticizer monomer.

Optionally, according to the above preparation method, the step (2) also comprises mixing the chain transfer agent with the unsaturated carboxylic acid.

Optionally, according to the above preparation method, in the step (3), said neutralizing and pulverizing are carried out by mixing the polycarboxylate superplasticizer precursor with an alkaline solution in a kneader, producing a powdery polycarboxylate superplasticizer having a pH of 5-8.

Optionally, according to the above preparation method, in the step (2):

the initiator is at least one of cumyl hydroperoxide and dicumyl peroxide, and the bulk polymerization reaction is carried out at a reaction temperature of 80-120° C.; or, the initiator is dilauroyl peroxide, and the bulk polymerization reaction is carried out at a reaction temperature of 70-100° C.; or, the initiator is at least one of tert-butyl peroxybenzoate and dicyclohexyl peroxydicarbonate, and the bulk polymerization reaction is carried out at a reaction temperature of 50-70° C.

Optionally, according to the above preparation method, in the step (2), the bulk polymerization reaction is carried out for a period of 2-2.5 h, producing a reaction product; then the reaction product is cured for a period of 2-2.5 h at 60-75° C. to form a polycarboxylate superplasticizer precursor.

Optionally, according to the above preparation method, in the step (1), the superplasticizer monomer is melted at 45-55° C.

Optionally, according to the above preparation method, a mass ratio of the superplasticizer monomer to the unsaturated carboxylic acid to the chain transfer agent to the initiator is 1:(0.05-0.15):(0.1-0.15):(0.45-0.65).

Optionally, according to the above preparation method, the superplasticizer monomer is at least one selected from the group consisting of:

allyl alcohol, methallyl alcohol, 3-methyl-2-buten-1-ol, butenol, heptenol, propylene glycol ether, methyl propylene glycol ether, tetrahydroxy butyl vinyl ether, tetrahydroxybutyl methacrylate, methyl allyl polyoxyethylene ether, isobutenol polyoxyethylene ether, allyl alcohol polyoxyethylene ether, allylamine, diallylamine, 2-methylallylamine and ethyl allyl amine, and any homologue thereof.

Optionally, according to the above preparation method, the unsaturated carboxylic acid is at least one selected from the group consisting of:

acrylic acid, maleic anhydride, methacrylic acid, cinnamic acid and crotonic acid.

Optionally, according to the above preparation method, the chain transfer agent is at least one selected from the group consisting of:

mercaptoacetic acid, 3-mercaptopropionic acid, sodium methylallyl sulfonate and mercaptoethanol.

Compared with the prior art, the disclosure has the following advantages:

1. the preparation method of the powdery polycarboxylate superplasticizer provided by the disclosure comprises the steps of (1) mixing the superplasticizer monomer with water to produce a mixture, and heating and melting the mixture to produce a melt system; (2) carrying out a bulk polymerization reaction by adding the initiator, the chain transfer agent and the unsaturated carboxylic acid into the melt system produced in the step (1), forming the polycarboxylate superplasticizer precursor; and (3) neutralizing and pulverizing the polycarboxylate superplasticizer precursor to produce the powdery polycarboxylate superplasticizer.

At present, the polycarboxylate superplasticizer is synthesized mainly through aqueous solution polymerization or bulk polymerization. In the aqueous solution polymerization reaction, water is utilized as a solvent to create a good reaction environment for synthesis of the superplasticizer, the reaction conditions are easy to control, but the production concentration of synthesized polycarboxylate is only 20%-40%, so that the polycarboxylate superplasticizer is not suitable for storage and transportation. The bulk polymerization reaction occurs in the absence of solvents, a solid polycarboxylate superplasticizer with high solid content can be synthesized, but the bulk polymerization reaction is vigorous, the heat is not easily lost, and local implosion occurs easily, resulting in a decrease of the performance of the synthesized polycarboxylate superplasticizer.

Through research, the disclosure has found that different from the performance that water is used as a solvent to provide the reaction environment in aqueous solution polymerization, water is added in the bulk polymerization reaction, water can be used as a reactant to react with the superplasticizer monomer and the unsaturated carboxylic acid, and interact with the superplasticizer monomer and the like in the bulk polymerization reaction, so that the synthesized polycarboxylate superplasticizer can improve the dispersion performance of cement; moreover, in the reaction process, the mixed water can increase the degree of freedom of the superplasticizer monomer and the unsaturated carboxylic acid in the bulk polymerization reaction system, increase the fluidity of the reaction system, lower the viscosity of the system, improve the heat conductivity of the reaction system to avoid local reaction overheating or implosion, so that the dosage of active components playing the role of dispersion in the formed solid polycarboxylate superplasticizer precursor is increased, the dispersion performance of cement is good, and the fluidity of cement paste is improved.

The above synthesized polycarboxylate superplasticizer precursor is neutralized and pulverized to finally form the powdery polycarboxylate superplasticizer, and it is beneficial to the long-distance transportation of the superplasticizer, so that the transportation cost is lowered; moreover, the application range of the polycarboxylate superplasticizer is expanded, so that the superplasticizer is suitable for dry-mixed mortar, grouting materials and other products. Meanwhile, the powdery polycarboxylate superplasticizer product can reduce the content of volatile components such as formaldehyde when used indoors.

2. According to the preparation method provided by the disclosure, in the step (1), the mixing amount of the water is 0.8-1.2 wt % of the mixing amount of the superplasticizer monomer. A large number of experiments prove that when the mixing amount of the water is 0.8-1.2 wt % of the mixing amount of the superplasticizer monomer, the high efficiency of the bulk polymerization reaction can be ensured, and a solid superplasticizer with high solid content can be produced, thereby reducing the transportation and storage costs of the superplasticizer; also water can participate in the bulk polymerization reaction to reduce system viscosity and increase heat conductivity, thereby synthesizing the high-performance polycarboxylate superplasticizer which has high fluidity on cement paste.

3. According to the preparation method of the powdery polycarboxylate superplasticizer provided by the disclosure, in the step (3), the neutralizing and pulverizing are carried out by mixing the polycarboxylate superplasticizer precursor with the alkaline solution in the kneader, producing the powdery polycarboxylate superplasticizer having a pH of 5-8.

The superplasticizer is neutralized and pulverized in the kneader, the polycarboxylate superplasticizer precursor and the alkaline solution are stirred and mixed in the kneader, the polycarboxylate superplasticizer is neutralized by utilizing the alkaline solution, a pH value of the superplasticizer is 5-8 so as to be beneficial to increasing the fusion point of the superplasticizer and promoting the change of the phase state of the superplasticizer, thereby producing the solid polycarboxylate superplasticizer. The polycarboxylate superplasticizer can also be pulverized in the kneader while neutralized, and the powdery polycarboxylate superplasticizer is produced in one step operation. Compared with a traditional process of producing the powdery polycarboxylate superplasticizer by spray drying, the preparation method can avoid the loss of water reducing performance or agglomeration of the superplasticizer caused by a high temperature treatment process, and solve the energy consumption problem caused by high temperature, and the powdering treatment process of the polycarboxylate superplasticizer is completed through a one-step method.

4. According to the preparation method of the powdery polycarboxylate superplasticizer provided by the disclosure, the reaction temperature and the use ratio of the superplasticizer monomer, the unsaturated carboxylic acid, the chain transfer agent and the initiator are set so as to avoid local overhigh reaction temperature and implosion, avoid the gel effect, improve the effective water reducing components of the polycarboxylate superplasticizer, and improve the dispersion of cement and the fluidity of cement paste.

DETAILED DESCRIPTION

In order to better understand the disclosure, the following embodiments are provided, are not limited to the optimal embodiments, and are not intended to limit the contents and scope of protection of the disclosure, and any product identical or similar to the disclosure, which is obtained under the inspiration of the disclosure or by combination of the disclosure with the features of other prior arts by anyone, falls in the scope of protection of the present disclosure.

If no specific experimental steps or conditions are indicated in the embodiments, the operations or conditions of the conventional experimental procedures described in the literature in the art may be employed. The reagents or instruments used which are not noted by the manufacturers are all conventional reagent products which are commercially available. 1 part by mass in the following embodiments represents a substance mass of 500 g.

Embodiment 1

The embodiment provides a preparation method of a powdery polycarboxylate superplasticizer, specifically comprising the following steps:

(1) putting 1 part by mass of isobutenol polyoxyethylene ether (SPEG, molecular weight: 2400), 0.01 part by mass of deionized water into a reactor, and replacing the air in the reactor with nitrogen; and increasing the temperature in the reactor to 55° C., and melting SPEG;

(2) adding 0.5 part by mass of cumyl hydroperoxide into melted SPEG, then increasing the temperature in the reactor to 115° C., and then starting to dropwise add mixed liquor of 0.05 part by mass of acrylic acid and 0.1 part by mass of 3-mercaptopropionic acid; and (3) controlling the temperature in the reactor to be 115-120° C. and the pressure in the reactor to be smaller than 0.1 MPa, and dropwise adding the mixed liquor of acrylic acid and 3-mercaptopropionic acid within 2 h; and after dropwise addition (bulk polymerization reaction), continuing to cure for a period of 2 h at the temperature of 75° C. to produce a polycarboxylate superplasticizer precursor;

discharging the polycarboxylate superplasticizer precursor into a kneader, adding a NaOH solution into the kneader, stirring and mixing the polycarboxylate superplasticizer precursor and the NaOH solution in the kneader, neutralizing the polycarboxylate superplasticizer precursor, and adjusting the pH value thereof to be 6; and meanwhile, stirring and crushing the polycarboxylate superplasticizer precursor in the kneader to produce a powdery polycarboxylate superplasticizer finished product. Product appearance: yellowish powder.

Embodiment 2

The embodiment provides a preparation method of a powdery polycarboxylate superplasticizer, specifically comprising the following steps:

(1) putting 0.3 part by mass of methyl allyl polyoxyethylene ether (TPEG, molecular weight: 2400), 0.7 part by mass of SPEG (molecular weight: 2400), 0.008 part by mass of deionized water into a reactor, and replacing the air in the reactor with nitrogen; and increasing the temperature in the reactor to 45° C., and melting TPEG and SPEG;

(2) adding 0.65 part by mass of dicumyl peroxide into melted TPEG and SPEG, then increasing the temperature in the reactor to 80° C., and then starting to dropwise add mixed liquor of 0.1 part by mass of methacrylic acid and 0.15 part by mass of mercaptoacetic acid;

(3) controlling the temperature in the reactor to be 80-85° C. and the pressure in the reactor to be smaller than 0.1 MPa, and dropwise adding the mixed liquor of methacrylic acid and mercaptoacetic acid within 2.5 h; and after dropwise addition, continuing preserving heat for a period of 2 h at the temperature of 65° C. to produce a polycarboxylate superplasticizer precursor;

discharging the polycarboxylate superplasticizer precursor into a kneader, adding a trihydroxypropyl hydroxyethyl ethylenediamine solution into a kneader, stirring and mixing the polycarboxylate superplasticizer precursor and the trihydroxypropyl hydroxyethyl ethylenediamine solution in the kneader, neutralizing the polycarboxylate superplasticizer precursor, and adjusting the pH value thereof to be 5; and meanwhile, stirring and crushing the polycarboxylate superplasticizer precursor in the kneader to produce a powdery polycarboxylate superplasticizer finished product. Product appearance: yellowish powder.

Embodiment 3

The embodiment provides a preparation method of a powdery polycarboxylate superplasticizer, specifically comprising the following steps:

(1) putting 1 part by mass of allyl alcohol polyoxyethylene ether (APEG, molecular weight: 3000) and 0.012 part by mass of deionized water into a reactor, and replacing the air in the reactor with nitrogen; and increasing the temperature in the reactor to 55° C., and melting APEG;

(2) adding 0.45 part by mass of dilauroyl peroxide into melted APEG, then increasing the temperature in the reactor to 70° C., and then starting to dropwise add mixed liquor of 0.15 part by mass of maleic anhydride and 0.11 part by mass of 3-mercaptopropionic acid;

(3) controlling the temperature in the reactor to be 70-75° C. and the pressure in the reactor to be smaller than 0.1 MPa, and dropwise adding the mixed liquor of maleic anhydride and 3-mercaptopropionic acid within 2 h; and after dropwise addition, continuing preserving heat for a period of 2.5 h at the temperature of 70° C. to produce a polycarboxylate superplasticizer precursor;

discharging the polycarboxylate superplasticizer precursor into a kneader, adding a N,N,N',N'-tetrakis(2-hydroxypropyl)ethylenediamine solution into the kneader, stirring and mixing the polycarboxylate superplasticizer precursor and the N,N,N',N'-tetrakis(2-hydroxypropyl)ethylenediamine solution in the kneader, neutralizing the polycarboxylate superplasticizer precursor, and adjusting the pH value thereof to be 7; and meanwhile, stirring and crushing the polycarboxylate superplasticizer precursor in the kneader to produce a powdery polycarboxylate superplasticizer finished product. Product appearance: yellowish powder.

Embodiment 4

The embodiment provides a preparation method of a powdery polycarboxylate superplasticizer, specifically comprising the following steps:

(1) putting 1 part by mass of SPEG (molecular weight: 3000) and 0.011 part by mass of deionized water into a reactor, and replacing the air in the reactor with nitrogen; and increasing the temperature in the reactor to 48° C., and melting SPEG;

(2) adding 0.55 part by mass of dilauroyl peroxide into melted SPEG, then increasing the temperature in the reactor to 100° C., and then starting to dropwise add mixed liquor of 0.08 part by mass of cinnamic acid and 0.13 part by mass of mercaptoethanol;

(3) controlling the temperature in the reactor to be 95-100° C. and the pressure in the reactor to be smaller than 0.1 MPa, and dropwise adding the mixed liquor of cinnamic acid and mercaptoethanol within 2.5 h; and after dropwise addition, continuing preserving heat for a period of 2 h at the temperature of 75° C. to produce a polycarboxylate superplasticizer precursor;

discharging the polycarboxylate superplasticizer precursor into a kneader, adding a trihydroxypropyl hydroxyethyl ethylenediamine solution into the kneader, stirring and mixing the polycarboxylate superplasticizer precursor and the trihydroxypropyl hydroxyethyl ethylenediamine solution in the kneader, neutralizing the polycarboxylate superplasticizer precursor, and adjusting the pH value thereof to be 8; and meanwhile, stirring and crushing the polycarboxylate superplasticizer precursor in the kneader to produce a powdery polycarboxylate superplasticizer finished product. Product appearance: yellowish powder.

Embodiment 5

The embodiment provides a preparation method of a powdery polycarboxylate superplasticizer, specifically comprising the following steps:

(1) putting 0.2 part by mass of methyl propylene glycol ether (molecular weight: 2400), 0.8 part by mass of SPEG (molecular weight: 2400) and 0.009 part by mass of deionized water into a reactor, and replacing the air in the reactor with nitrogen; and increasing the temperature in the reactor to 52° C., and melting methyl propylene glycol ether and SPEG;

(2) adding 0.6 part by mass of tert-butyl peroxybenzoate into melted methyl propylene glycol ether and SPEG, then increasing the temperature in the reactor to 50° C., and then starting to dropwise add mixed liquor of 0.05 part by mass of crotonic acid and 0.12 part by mass of sodium methylallyl sulfonate;

(3) controlling the temperature in the reactor to be 50-55° C. and the pressure in the reactor to be smaller than 0.1 MPa, and dropwise adding the mixed liquor of crotonic acid and sodium methylallyl sulfonate within 2 h; and after dropwise addition, continuing preserving heat for a period of 2.5 h at the temperature of 60° C. to produce a polycarboxylate superplasticizer precursor;

discharging the polycarboxylate superplasticizer precursor into a kneader, adding a NaOH solution into the kneader, stirring and mixing the polycarboxylate superplasticizer precursor and the NaOH solution in the kneader, neutralizing the polycarboxylate superplasticizer precursor, and adjusting the pH value thereof to be 8; and meanwhile, stirring and crushing the polycarboxylate superplasticizer precursor in the kneader to produce a powdery polycarboxylate superplasticizer finished product. Product appearance: yellowish powder.

Embodiment 6

The embodiment provides a preparation method of a powdery polycarboxylate superplasticizer, specifically comprising the following steps:

(1) putting 1 part by mass of 2-methylallylamine and 0.01 part by mass of deionized water into a reactor, and replacing the air in the reactor with nitrogen; and increasing the temperature in the reactor to 45° C., and melting 2-methylallylamine;

(2) adding 0.45 part by mass of dicyclohexyl peroxydicarbonate into melted 2-methylallylamine, then increasing the temperature in the reactor to 70° C., and then starting to dropwise add mixed liquor of 0.12 part by mass of acrylic acid and 0.14 part by mass of 3-mercaptopropionic acid;

(3) controlling the temperature in the reactor to be 65-70° C. and the pressure in the reactor to be smaller than 0.1 MPa, and dropwise adding the mixed liquor of acrylic acid and 3-mercaptopropionic acid within 2.5 h; and after dropwise addition, continuing preserving heat for a period of 2 h at the temperature of 73° C. to produce a polycarboxylate superplasticizer precursor;

discharging the polycarboxylate superplasticizer precursor into a kneader, adding a trihydroxypropyl hydroxyethyl ethylenediamine solution into the kneader, stirring and mixing the polycarboxylate superplasticizer precursor and the trihydroxypropyl hydroxyethyl ethylenediamine solution in the kneader, neutralizing the polycarboxylate superplasticizer precursor, and adjusting the pH value thereof to be 6; and meanwhile, stirring and crushing the polycarboxylate superplasticizer precursor in the kneader to produce a powdery polycarboxylate superplasticizer finished product. Product appearance: yellowish powder.

Comparison Embodiment 1

The embodiment provides a preparation method of a powdery polycarboxylate superplasticizer, and the difference from the preparation method of the powdery polycarboxylate superplasticizer provided by the embodiment 1 is only that the mixing amount of deionized water is 0.5% by mass. Product appearance: yellowish powder.

Comparison Embodiment 2

The embodiment provides a preparation method of a powdery polycarboxylate superplasticizer, and the difference from the preparation method of the powdery polycarboxylate superplasticizer provided by the embodiment 1 is only that the mixing amount of deionized water is 1.8% by mass. Product appearance: yellowish powder.

Test Embodiment 1

The effects of the polycarboxylate superplasticizers prepared by the embodiments 1-6 and the polycarboxylate superplasticizers prepared by the comparison embodiments 1-2 on the cement fluidity of reference cement are tested. The test is performed in accordance with the national standard GB/T8077-2000 "Methods for testing uniformity of concrete admixtures", W/C=0.29, the mixing amount (solid mixing amount) of a polycarboxylate superplasticizer finished product is 0.08%, and the test results are as shown in table 1.

TABLE 1 test for cement dispersion with the polycarboxylate superplasticizer

| Polycarboxylate superplasticizer | Paste fluidity/mm |
|---|---|
| Embodiment 1 | 213 |
| Embodiment 2 | 210 |
| Embodiment 3 | 211 |
| Embodiment 4 | 211 |
| Embodiment 5 | 210 |
| Embodiment 6 | 209 |
| Comparison Embodiment 1 | 185 |
| Comparison Embodiment 2 | 172 |

As seen from the table 1, compared with the polycarboxylate superplasticizers prepared by the comparison embodiments 1-2, the powdery polycarboxylate superplasticizers prepared by the embodiments 1-6 have the advantages that when the mixing amount of water is 0.8-1.2 wt %, the fluidity of cement paste is improved, and the superplasticizer improves the cement dispersion. Therefore, due to utilization of the powdery polycarboxylate superplasticizer prepared by the preparation method of the disclosure, the high-performance polycarboxylate superplasticizer can be synthesized by adding water, and when the mixing amount of water is 0.8-1.2 wt %, the polycarboxylate superplasticizer with optimal cement dispersion can be produced. Meanwhile, in the preparation method provided by the disclosure, the pulverization process of the solid polycarboxylate superplasticizer is completed through a one-step method to produce the powdery polycarboxylate superplasticizer, the production and processing processes of conventional powdery polycarboxylate superplasticizers are simplified, the processing energy consumption of the powdery polycarboxylate superplasticizer is lowered, and the prepared superplasticizer finished product is suitable for long-distance transportation, so that the transportation cost is lowered.

Obviously, the above-mentioned embodiments are only examples given for clear illustration and are not intended to limit the implementations. Other variations or modifications of the various forms may be made by ordinary technical personnel in the art on the basis of the above-mentioned description. There is no need and no way to exhaust all of the implementations. The obvious variations or modifications derived therefrom are still within the scope of protection created by the disclosure.

The invention claimed is:

1. A preparation method of a powdery polycarboxylate superplasticizer, comprising the following steps:
    (1) mixing a superplasticizer monomer with water to produce a mixture, and heating and melting the mixture to produce a melt system, wherein a mixing amount of the water is 0.8-1.2 wt % of a mixing amount of the superplasticizer monomer;
    (2) carrying out a bulk polymerization reaction by adding an initiator, a chain transfer agent, and an unsaturated carboxylic acid into the melt system produced in the step (1), forming a polycarboxylate superplasticizer precursor; and
    (3) neutralizing and pulverizing the polycarboxylate superplasticizer precursor to produce a powdery polycarboxylate superplasticizer.

2. The preparation method of claim 1, wherein the step (2) also comprises mixing the chain transfer agent with the unsaturated carboxylic acid.

3. The preparation method of claim 1, wherein in the step (3), said neutralizing and pulverizing are carried out by mixing the polycarboxylate superplasticizer precursor with an alkaline solution in a kneader to reach a pH of 5-8, producing a powdery polycarboxylate superplasticizer.

4. The preparation method of claim 1, wherein in the step (2),
    the initiator is at least one of cumyl hydroperoxide and dicumyl peroxide, and the bulk polymerization reaction is carried out at a reaction temperature is 80-120° C.; or
    the initiator is dilauroyl peroxide, and the bulk polymerization reaction is carried out at a reaction temperature of 70-100° C.; or
    the initiator is at least one of tert-butyl peroxybenzoate and dicyclohexyl peroxydicarbonate, and the bulk polymerization reaction is carried out at a reaction temperature of 50-70° C.

5. The preparation method of claim 1, wherein in the step (2), the bulk polymerization reaction is carried out for a period of 2-2.5 h, producing a reaction product; then the reaction product is cured for a period of 2-2.5 h at 60-75° C. to form a polycarboxylate superplasticizer precursor.

6. The preparation method of claim 1, wherein in the step (1), the superplasticizer monomer is melted at 45-55° C.

7. The preparation method of claim 1, wherein a mass ratio of the superplasticizer monomer to the unsaturated carboxylic acid to the chain transfer agent to the initiator is 1:(0.05-0.15):(0.1-0.15):(0.45-0.65).

8. The preparation method of claim 1, wherein the superplasticizer monomer is at least one selected from the group consisting of:
    allyl alcohol, methallyl alcohol, 3-methyl-2-buten-1-ol, butenol, heptenol, propylene glycol ether, methyl propylene glycol ether, tetrahydroxy butyl vinyl ether, tetrahydroxybutyl methacrylate, methyl allyl polyoxyethylene ether, isobutenol polyoxyethylene ether, allyl alcohol polyoxyethylene ether, allylamine, diallylamine, 2-methylallylamine and ethyl allyl amine, and any homologue thereof.

9. The preparation method of claim 1, wherein the unsaturated carboxylic acid is at least one selected from the group consisting of:
    acrylic acid, maleic anhydride, methacrylic acid, cinnamic acid and crotonic acid.

10. The preparation method of claim 1, wherein the chain transfer agent is at least one selected from the group consisting of:
    mercaptoacetic acid, 3-mercaptopropionic acid, sodium methylallyl sulfonate and mercaptoethanol.

* * * * *